Figure 1:
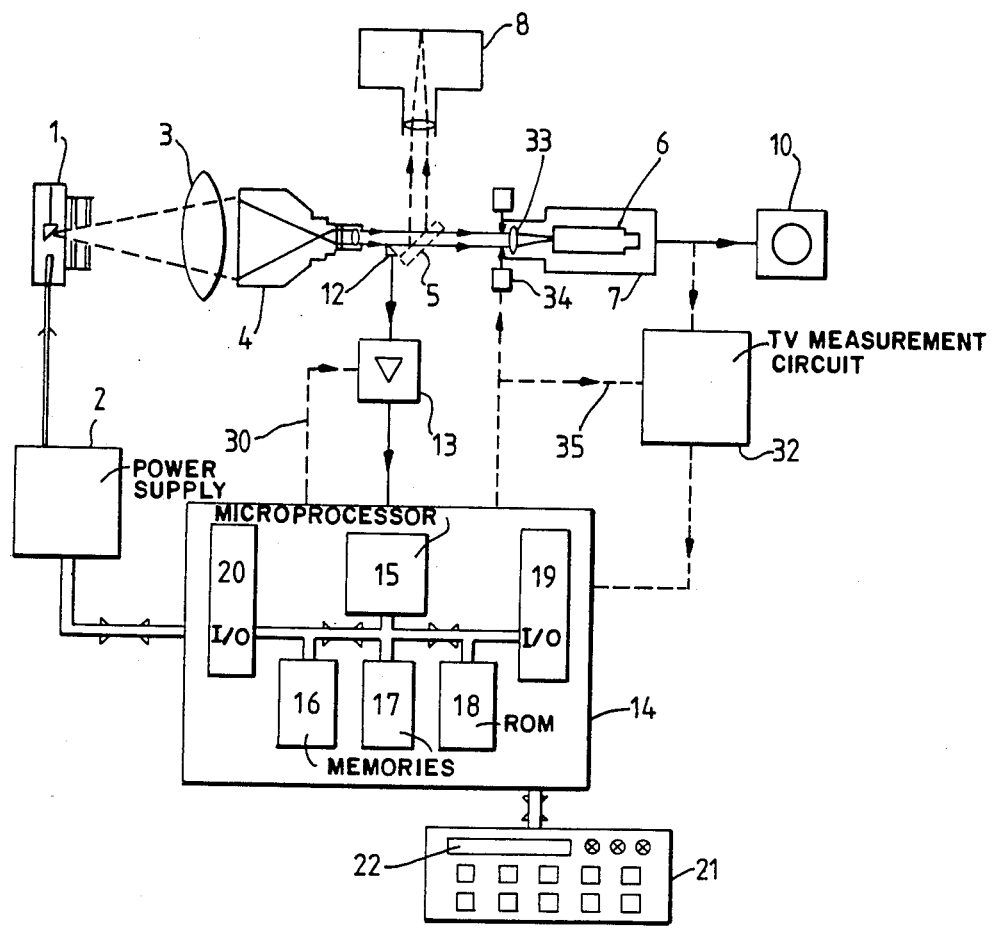

United States Patent [19]

Spaak

[11] Patent Number: 4,747,118
[45] Date of Patent: May 24, 1988

[54] X-RAY EXAMINATION SYSTEM AND METHOD OF CONTROLLING AN EXPOSURE THEREIN

[75] Inventor: Willem E. Spaak, Eindhoven, Netherlands

[73] Assignee: U.S. Philips Corporation, New York, N.Y.

[21] Appl. No.: 856,611

[22] Filed: Apr. 25, 1986

[30] Foreign Application Priority Data

Apr. 29, 1985 [GB] United Kingdom ............... 8510863

[51] Int. Cl.$^4$ ........................................... H05G 1/34
[52] U.S. Cl. .................................. 378/110; 378/108; 378/109
[58] Field of Search ............. 378/96, 97, 106, 108–110, 378/118

[56] References Cited

U.S. PATENT DOCUMENTS

| 2,913,582 | 11/1959 | Collins et al. ............. | 378/110 |
| 3,917,949 | 11/1975 | Winkler .................... | 378/118 |
| 4,562,586 | 12/1985 | Honda et al. ............... | 378/108 |
| 4,638,500 | 1/1987 | Smits et al. ................ | 378/109 |

FOREIGN PATENT DOCUMENTS

| 2204453 | 9/1977 | Fed. Rep. of Germany ...... | 378/110 |
| 1486198 | 9/1977 | United Kingdom ............ | 378/112 |
| 1489377 | 10/1977 | United Kingdom . | |
| 2021810 | 12/1979 | United Kingdom ............ | 378/112 |
| 1599707 | 10/1981 | United Kingdom ............ | 378/112 |

*Primary Examiner*—Craig E. Church
*Assistant Examiner*—John C. Freeman
*Attorney, Agent, or Firm*—Jack E. Haken

[57] ABSTRACT

An X-ray examination system comprising an X-ray generator, an image intensifier tube connected to an output optical path and an X-ray exposure control arrangement which measures the light image intensity LI at the output of the image intensifier during fluoroscopy, and from the relationship $$I_{EXP1} = (LA \times I_{FL})/LI \times T_{EXP},$$

derives the exposure value $I_{EXP1}$ of the switch-on tube current required to provide a desired exposure density during subsequent fluorography with a tube voltage $V_{FL}$ and exposure time $T_{EXP}$, and wherein LA is a predetermined constant.

12 Claims, 2 Drawing Sheets

X-RAY EXAMINATION SYSTEM AND METHOD OF CONTROLLING AN EXPOSURE THEREIN

The invention relates to a method of controlling, in an X-ray examination system including an X-ray tube, the magnitude of the switch-on tube current to provide a proposed radiographic exposure density E as a result of an exposure having a predetermined duration $T_{EXP}$, including the steps of carrying out an exposure measurement by applying to the X-ray tube a respective predetermined tube voltage V and tube current I and measuring the intensity of the X-radiation beyond an object under examination located in the path of X-radiation from the X-ray tube by sensing means coupled to an X-ray exposure control arrangement arranged to derive therefrom an exposure value $I_{EXP}$ for the switch-on tube current which together with the predetermined tube voltage V will provide the proposed radiographic exposure density E by means of an exposure having the predetermined duration $T_{EXP}$.

The invention further relates to an X-ray examination system including an X-ray generator comprising an X-ray tube and a controllable power supply, sensing means for sensing X-radiation beyond an object under examination located in the path of X-radiation from the X-ray tube, an X-ray exposure control arrangement connected to the sensing means and arranged, on the application of a respective predetermined tube voltage V and tube current I to the X-ray tube, to perform an exposure measurement during which the sensed radiation is measured and the measurement used to derive an exposure value $I_{EXP}$ for the switch-on tube current which together with the predetermined tube voltage V will provide a predetermined exposure density E by means of an exposure having a predetermined duration $T_{EXP}$.

Such an X-ray examination system and method of controlling, therein, the magnitude of the switch-on tube current for an exposure, are known for example from U.K. Patent Specification GB No. 1,489,377 which discloses an X-radiation-sensitive element, such as a gas ionisation chamber, located so as to measure the amount of X-radiation passed by an object. The output from this element is fed to an X-ray exposure control arrangement which is also supplied with inputs indicative of the tube current, tube voltage and exposure duration. The output of the exposure control arrangement then indicates the tube switch-on current $I_{EXP}$ required to provide a predetermined exposure density E at the given tube voltage. In fact the first exposure comprises a test exposure at a suitable initial value of tube voltage $V_{TEST}$ and tube current $I_{TEST}$, well within the operating boundary limits of the X-ray tube.

The system described and claimed in GB No. 1,489,377 then computes the intersection of a constant exposure-density function formed by the tube voltage plotted against the natural logarithm of the tube current, and a tube operating range limiting boundary function so as to determine the minimum tube voltage and corresponding tube current that can be employed for the same exposure density, since this lower voltage will, in general, provide a radiograph with maximum contrast. However, because the object under examination may not exhibit the same change in transparency with the consequent change in the hardness of the X-radiation as is assumed when defining the constant exposure-density function, a further test exposure becomes necessary when the first apparent minimum tube voltage has been determined, and this again will have to be carried out well within the operating limits of the X-ray tube. The computation is then repeated and after two or three iterations a sufficiently accurate minimum-tube-voltage/maximum-irradiation-intensity exposure condition will be determined for the predetermined exposure duration.

The arrangement described in GB No. 1,489,377 has the disadvantages that it subjects the patient to additional test exposures and the exposure measurement is made directly on the incident X-radiation. When an X-ray image intensifier is employed, however, and fluorographic exposures are made of the image intensifier output image by means of a photographic camera, the exposure data provided by the said arrangement are no longer found to be sufficiently reliable or consistent. To reduce or remove this difficulty further calculation possibilities are required.

It is an object of the invention to provide a system and method of the kind specified in which these disadvantages can be reduced and minimised.

In order to achieve this object there is provided in accordance with the invention a method of the kind specified in which the system includes an X-ray image intensifier and light sensitive means arranged to determine the luminous intensity of at least part of the output image of the X-ray image intensifier, characterised in that an exposure measurement is performed during fluoroscopy using the tube voltage $V_{FL}$ and the tube current $I_{FL}$ applied for a fluoroscopy examination during which the luminous intensity LI of at least part of the output image of the image intensifier tube, is measured and the exposure value $I_{EXP}$ for the switch-on tube current relating to a tube voltage $V_{FL}$ is calculated from the tube current $I_{FL}$, the luminous intensity LI and the predetermined exposure duration $T_{EXP}$.

The method may be further characterised in that the exposure value $I_{EXP}$ for the switch-on tube current relating to the tube voltage $V_{FL}$ is derived by computation using the relationship:

$$I_{EXP1} = (I_{FL} \times LA)/(LI \times T_{EXP}),$$

wherein LA is a predetermined calibration constant.

When the system includes a video camera for deriving the fluoroscopy image for display, the method can include the steps of determining the luminous intensity LI from the amplitude of the video signal. If it is desired to carry out the proposed exposure at a tube voltage $V_{EXP}$ which is different from the voltage $V_{FL}$ used during fluoroscopy a corresponding new exposure value $I_{EXP2}$ can be derived for the switch-on tube current from the exposure value $I_{EXP1}$ corresponding to the tube voltage $V_{FL}$ used during fluoroscopy in accordance with the relationship:

$$I_{EXP2} \approx I_{EXP1} \times |V_{FL}/V_{EXP}|^p,$$

where p is a function of the tube voltage and depends also on the nature of the object under examination and on a high-voltage-dependent factor relating to the X-ray system. The sign $\approx$ is employed to take account of the situation arising when a diaphragm is mounted on an X-ray image intensifier since the new tube current $I_{EXP2}$ will then also be dependent on the extent to which the diaphragm is opened.

In further accord with the invention there is provided an X-ray examination system of the kind specified in which the system includes an X-ray image intensifer and light sensitive means arranged to determine the luminous intensity of at least part of the output image of the X-ray image intensifier, characterised in that the light sensing means includes means arranged to provide an output signal LI representative of the luminous intensity of at least part of the output image of the image intensifier tube, said output signal being applied to the X-ray exposure control arrangement so that it carries out an exposure measurement during fluoroscopy using the tube voltage $V_{FL}$ and the tube current $I_{FL}$ then applied in order to calculate an exposure value $I_{EXP1}$ for the switch-on tube current relating to a tube voltage $V_{FL}$, from the tube current $I_{FL}$, the luminous intensity LI and the predetermined exposure duration $T_{EXP}$. The X-ray examination system may be further characterised in that the X-ray exposure control arrangement is arranged to calculate the exposure value $I_{EXP}$ for the switch-on tube current relating to the tube voltage $V_{FL}$ by using the relationship:

$$I_{EXP1} \approx (I_{FL} \times LA)/(LI \times T_{EXP}),$$

wherein LA is a predetermined calibration constant.

The light sensing means can comprise a photocell such as a photomultiplier or a light sensitive transistor, or it can comprise a video camera tube for relaying fluoroscopy images from the image intensifier output screen to a display monitor, and suitable circuit means can readily be provided for deriving a signal representing the intensity LI from the peak or the mean value of the video output signal from the camera tube.

The invention is based on the realisation that when a radiographic record is to be made from the output screen of an X-ray image intensifier by photographic means, a more consistent measure of the required exposure data can be provided by measuring the light intensity relating to the image of the output screen of the image intensifier, and that such a measurement can be used to determine a switch-on tube current for a given exposure time and density, which is substantially independent of the variations often found to occur in the transfer characteristics of an X-ray image intensifier.

The invention is further based on the realisation that such a measurement of the light intensity of the output image can readily be carried out while a fluoroscopy examination is in progress so that a fluorographic exposure may then be undertaken without the need for additional test exposures and therefore of adding undesirably to the overall patient dose.

Figure 2:
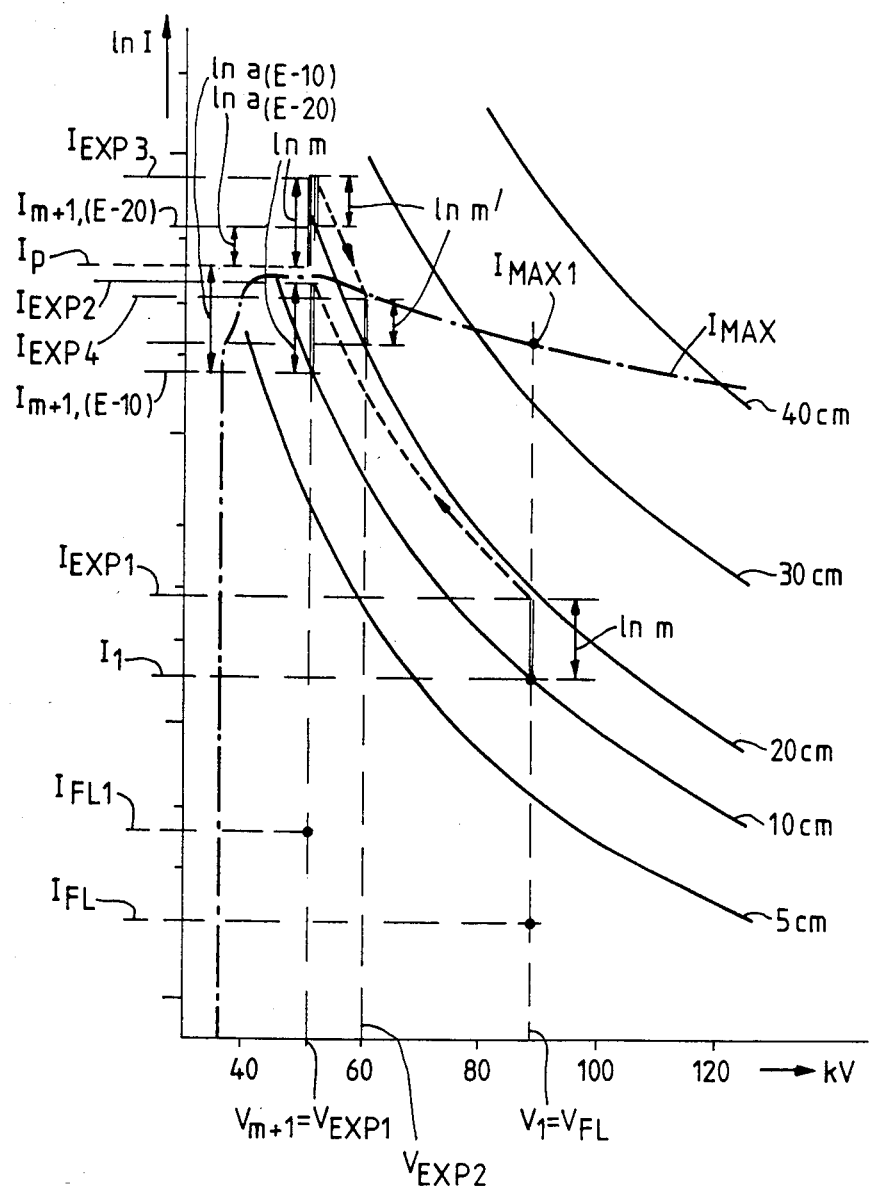

An embodiment of the invention will now be described by way of example with reference to the accompanying drawings of which:

FIG. 1 is a schematic diagram illustrating an X-ray examination system embodying the invention, and FIG. 2 is a graph illustrating the E-value curves employed in the system.

An X-ray examination system embodying the invention, is illustrated schematically in FIG. 1. An X-ray tube 1 is connected to a controllable power supply 2. In the case of the conventional diode form of X-ray tube, the tube current, which means the electron emission current which passes from cathode to anode, is caused to flow by the application of the tube voltage, namely a high voltage, between the anode and the cathode. The tube current is emission limited and depends on the temperature of the cathode, and hence on the heater current, and also on the tube voltage.

Furthermore, the actual tube current can only be measured after the application of the tube voltage for example after the start of an exposure. If the current is incorrect it can only be altered, for a given tube voltage, by changing the cathode temperature, and because of thermal inertia this is a relatively slow process, at least by comparison with the duration of a typical fluorographic exposure which has to be short to minimise blurring due to motion. It is important, therefore, that the cathode of the X-ray tube should be preheated by a suitable heater current so that when a selected tube voltage is applied, the switch-on tube current should be of the desired magnitude. Preselection of the switch-on tube current can be effected, for example, by means of any of the arrangements described in U.K. Patent Specifications GB No. 2,021,810B, GB No. 1,599,707 and GB No. 1,486,198, and it is assumed herein that the controllable power supply 2 includes facilities for some form of tube current pre-control.

The X-ray examination system shown in FIG. 1 further comprises, in the path of X-radiation beyond an object 3 under examination, sensing means for sensing X-radiation beyond the object 3, in the form of an assembly of an X-ray image intensifier 4, a light distribution mirror 5, and a video camera tube 6 in a housing 7. The light distribution mirror 5 is displaceable into and out of the optical path from the output screen of the X-ray image intensifier 4. During a fluoroscopy examination the mirror 5 is removed from the optical path so that all the light relayed from the image intensifier output screen is directed to the video camera tube 6. When a fluorographic exposure to be made using a photographic film camera 8, the mirror 5 is returned to the optical path and is arranged to reflect approximately 85% of the light onto the film camera 8 and to pass about 10% of the light through to the video camera tube 6 so that the image field may continue to be monitored on a fluoroscopy display screen 10 while an exposure is being performed.

Light-sensitive means in the form of a photoelectric cell 12, suitably a photomultiplier or a photo-semiconductor device, is arranged to sense the luminous intensity of at least part of the output image of the X-ray image intensifier 4. The output of the photocell 12 is amplified by an amplifier 13 and is fed to a control assembly 14 during fluoroscopy, where it is compared with a preset reference to provide a control signal for the controllable power supply 2 to control the tube current of the X-ray tube 1 during fluoroscopy so as to maintain a predetermined (low) mean brightness level at the output of the image intensifier tube 4.

The control assembly 14 can take the form of a stored program microprocessor controlled system including a microprocessor 15, volatile and non-volatile random access memories 16 and 17, respectively, and a read only memory 18 for storing the operating system and programs for carrying out the various operational routines. The control assembly 14 is also provided with input and output devices 19 and 20, respectively, for data and command access, and for effecting output instructions. The operator is provided with a control panel in the form of a keyboard 21, indicated diagrammatically, for entering various control instructions, a display 22 being provided to indicate the operational status of the system.

The photoelectric cell 12 has also been employed hitherto in an X-ray examination system as a cumulative light meter which in conjunction with an X-ray exposure control arrangement included in the control assembly 14, is used to switch off the X-ray tube 1 via the power supply 2 at the end of a predetermined exposure dose. However, in this mode of operation, the duration of the exposure is uncertain and it is desirable in the case of certain forms of examination, to be able to use a predetermined exposure duration which is also preferably as short as possible within the working limits of the X-ray tube employed.

In order, therefore to carry out a method of controlling the magnitude of the switch-on current for the X-ray tube 1 so as to provide a proposed exposure density E as a result of an exposure having a predetermined duration $T_{EXP}$, the embodiment of FIG. 1 is arranged in accordance with the invention, to perform an exposure measurement during fluoroscopy, for which purpose the power supply 2 applies a tube voltage $V_{FL}$ and a tube current $I_{FL}$ to the X-ray tube 1, during which the luminous intensity LI of at least part of the output image of the image intensifier tube 4 is measured by means of the photocell 12 and the X-ray exposure control arrangement in the control assembly 14 is arranged to derive from that measurement and a measurement of the tube current $I_{FL}$, a switch-on tube current value $I_{EXP1}$ relating to the tube voltage $V_{FL}$ which would result in the desired exposure density E after an exposure duration $T_{EXP}$, by computation using the relationship:

$$I_{EXP1} \approx (I_{FL} \times LA)/LI \times T_{EXP}, \qquad (1)$$

where LA is a predetermined calibration constant. The computed value of the switch-on tube current $I_{EXP1}$ is stored in the memory 16 in readiness for use in controlling the tube-current control circuit of the power supply 2 when carrying out a subsequent corresponding fluorographic exposure.

The calibration factor LA is the photosensor calibration factor which gives the relationship between the average image intensifier light output during fluoroscopy and the average light output during a subsequent fluorographic exposure, and a corresponding value must be determined and suitably stored with respect to each form of auxiliary apparatus used in the X-ray beam in conjunction with an X-ray examination. When carrying out this determination, the brightness value LI and the tube current $I_{FL}$ are measured at a tube voltage $V_{FL}$, and a series of exposures are then carried out on a standard phantom using the tube voltage $V_{FL}$ to determine the corresponding tube current $I_{EXP}$ which provides the required exposure density E. The calibration factor is then found from the relationship $$LA \approx I_{EXP} \times T_{EXP} \times LI/I_{FL}, \qquad (2)$$

and this is stored in the non-volatile memory 17.

The method of determining the tube current required for an exposure in accordance with the invention, by measuring the light intensity in the output image of the image intensifier at the tube current $I_{FL}$ employed during fluoroscopy, and then applying a linear transformation, depends on the fact that the relationship between the exposure density for a given exposure duration and tube voltage, and the magnitude of the X-ray tube current, which relationship can be regarded as the gamma of the image intensifier tube, is a linear relationship. Corresponding relationships which involve a change in the X-ray tube voltage are, however, non-linear. Nevertheless it is often desired to carry out a fluorographic exposure at a tube voltage which is different from that employed during fluoroscopy. A change in the voltage will change the hardness of the X-radiation produced and therefore change the contrast of the resultant image.

Thus, when it is desired to carry out a fluorographic exposure at a tube voltage $V_{EXP}$ which is different from the tube voltage $V_{FL}$ used during fluorography by the method in accordance with the invention, firstly a value for the switch-on tube current $I_{EXP1}$ for a tube voltage $V_{FL}$, is determined as above described. The new value for the switch-on tube current $I_{EXP2}$ can then be determined by computation using the relationship:

$$I_{EXP2} \approx I_{EXP1} \times |V_{FL}/V_{EXP}|^p, \qquad (3)$$

where p is predetermined function of the tube voltage and depends also on the nature of the object under examination and on a high-voltage-dependent factor relating to the X-ray system.

The $\approx$ sign is used to mean that the left hand side of the equation, e.g. the tube current $I_{EXP2}$, is proportional to the expression to the right of the $\approx$ sign, and this is used to indicate that the tube current $I_{EXP2}$ for example, will depend on the degree of opening of a diaphragm when this is mounted on the X-ray image intensifier, and which, when present, will introduce a corresponding diaphragm-adjustment factor into the relationships (1), (2) and (3).

The relationship (3) is derived from the relation between the average quantity of light energy or E-value which provides a given exposure density on a recording film, and the X-ray tube parameters comprising the tube voltage V, the tube current I and the exposure time $T_{EXP}$, which is given by:

$$E = K \times V^P \times I \times T_{EXP}, \qquad (4)$$

where K is a suitable constant which, inter alia, takes the degree of diaphragm opening into account. From (4) and by means of a series of practical measurements, a series of constant exposure or E-curves may be plotted for different objects, for example water phantoms of different thickness, to provide an interrelationship between the tube current, conveniently the natural logarithm of the tube current, and the tube voltage for a constant exposure time. From the measurements, E-curves are plotted and corresponding approximate relationships are determined of the form $$\ln I = A \times V^B \times C(K), \qquad (5)$$

where A and B are empirically determined constants and C(K) is a constant dependent on K.

Measurements carried out using a Philips Type OM 200 X-ray generator provided the values set out in the following table and the corresponding E-curves are plotted in FIG. 2.

TABLE

| Water Thickness (t) cms | Voltage range min–max kV | Constants | |
|---|---|---|---|
| | | A | B |
| 5 | 40–125 | 163.5 | −0.8251 |
| 10 | 45–125 | 140.8 | −0.7462 |
| 20 | 50–125 | 163.8 | −0.7477 |

TABLE-continued

| Water Thickness (t) cms | Voltage range min-max kV | Constants A | B |
|---|---|---|---|
| 30 | 60–125 | 124.2 | −0.6350 |
| 40 | 80–125 | 155.2 | −0.6350 |

These curves relate, of course to a particular system and exposure time. In any given system and for any given set of exposure requirements, other measurement series would have to be carried out as part of the calibration of the system during the setting up procedures. Once the E-curves have been determined by measurement on different thicknesses of water phantom, it is not necessary in practice to determine those values of the constants A and B which provide the best fit of equation (5) because a table of measured tube current values $I_n$ on each E-curve can be stored, for example in the non-volatile memory store 17 using an address related to the tube voltage $V_n$ and the object thickness for which the E-curve has been measured. In order to derive the new current value $I_m$ the store is supplied with the address relating to the relevant E-curve and to the new voltage value $V_m$. Since the exposure at a given tube voltage $V_n$ is linearly related to the tube current $I_n$, it would be preferable to store the actual current value $I_n$ rather than the ln $I_n$ value relating to a given voltage $V_n$ at that address. In this way, for other exposure values or a different exposure duration the switch-on current $I_{EXP1}$ determined for a voltage $V_1 = V_{FL}$, can be used together with the current value $I_1$ stored at the address corresponding to $V_1$ to form a multiplying factor m, e.g. by determining the ratio $$m = I_{EXP1}/I_1,$$

and this factor m can then be used to form the new switch-on current $I_{EXP2}$ from the current value $I_2$ stored at the address corresponding to the selected exposure voltage $V_2 = V_{EXP}$, by multiplication, $$I_{EXP2} = m \times I_2. \quad (6)$$

In the case in which $I_1 = I_{EXP1}$, m will of course equal unity, however, the division and multiplication steps would still be carried out as before in order to simplify the processing routine.

A method in accordance with the invention can be further employed to carry out the technique of selecting the minimum tube voltage which can be used to carry out a given exposure while remaining within the operational limits of the X-ray tube as described for a radiographic exposure in U.K. Patent Specification GB No. 1,489,377. In the present case a limiting boundary function of the operating range of the X-ray tube can be stored as a table of maximum current values $L_{MAXn}$ at respective addresses corresponding to related voltages $V_n$ either in the non-volatile memory 17 or in the read only memory 18. As before, the switch-on tube current $I_{EXP1}$ at a tube voltage $V_{FL}$ is determined during fluoroscopy by computation from the measured light intensity LI and the fluoroscopy tube-current $I_{FL}$ which must also be measured since it will tend to vary in the present embodiment because of the automatic dose control also provided via the photocell 12. In the control assembly 14, the microprocessor 15 is then arranged to carry out a step-by-step search routine which compares the proposed value of the switch-on tube current $I_{EXP}$ at each of a succession of proposed tube voltages (e.g. $V_{FL}$ or $V_{EXPn} = V_n$) and which each correspond to the same fluorographic exposure value (E-value), with the limiting current $I_{MAXn}$ stored in the limiting boundary function table at the location whose address corresponds to the same voltage $V_n$. If $I_{EXP} < I_{MAXn}$ then the next adjacent address representing the lower voltage related location $V_{n-1}$ is used first to form the corresponding $I_{EXP}$ value from the E-curve table using the equation (6) correspondingly to form $I_{EXP(n-1)}$ ($= mI_{(n-1)}$), and then to compare this value with $I_{MAX(n-1)}$ similarly fetched from the limiting boundary function table. This search is illustrated in FIG. 2 by the broken line and is continued by stepping the voltage address by one place until at $V_m$, $I_{EXPm} > I_{MAXm}$. (For the sake of clarity $V_m$ is not illustrated in FIG. 2, it lies one voltage step to the left of $V_{m+1}$). The voltage address corresponding to $V_m$ is then stepped back to $V_{(m+1)}$ and the corresponding values $V_{EXP1} (= V_{(m+1)})$ and $I_{EXP2} (= I_{EXP1(m+1)})$ are stored as initial exposure values giving the proposed minimum tube voltage for the maximum contrast exposure condition. This is illustrated in FIG. 2 by a search starting from $V_1 = V_{FL}$ along the thickness curve for t=10 cms, indicated herein as (E-10). The value for t is initially selected by the operator. Because this change in voltage and consequent change in hardness of the X-radiation may not correspond in its effect on the exposure density of an image of the object under examination with its corresponding effect relative to the calibration phantom, it is desirable as described in GB No. 1,489,377, to carry out a further exposure measurement. This is effected, in accordance with the invention, by setting the tube voltage to the proposed initial exposure voltage value $V_{EXP1}$ so as to allow the automatic fluorography dose control to generate the tube current $I_{FL1}$. As soon as the current value has stabilised, new measurements of the image light intensity LI and the tube current $I_{FL1}$ are made and a new value of the switch-on tube current $I_{EXP3}$ is determined by computation as in the case of $I_{EXP1}$, from the relationship (1). The new value $I_{EXP3}$ may not be the same as the value $I_{EXP2}$ determined by the E-curve from $I_{EXP1}$, because of the nature of the object. If the two values $I_{EXP2}$ and $I_{EXP3}$ are the same within a predetermined acceptance limit, the value $I_{EXP2}$ is accepted and stored together with the proposed tube voltage, as the proposed switch-on tube current and voltage parameters for a fluorographic exposure should this be required.

If the two current values are unequal to an extent beyond the acceptance limit, the computer first divides $I_{EXP3}$ by the same factor m to generate a provisional equivalent table-based current value $I_p$ related to the thickness t=10 cms and the E-10 table, and searches the E-curve table at the voltage address $V_{m+1}$ corresponding to $V_{EXP}$ for that phantom thickness curve (E−t) providing the nearest value $I_{m+1, (E-t)}$ to the value $I_p$, where t can have any of the values 5, 10, 20, 30 or 40 indicated in FIG. 2. This can be done by generating for each value of t, the ratio $a_{(E-t)}$ from: $-\ln a_{(E-t)} = |\ln I_{m+1, (E-t)} - \ln I_p|$, and selecting the t-value corresponding to the smallest value of a(E−t). In the case of two equally small values, the smaller t-value is selected. This may prove to correspond to the curve originally followed which could have been selected by the operator in relation to the organ or the part of the body under examination. In the example of FIG. 2, however, the curve (E-20) is selected. In any event the computer selects the identified thickness range of the E-value table, computes a new value of m, designated m', which similarly relates $I_{EXP}$ to the value of $I_{m+1}$, (E-20) stored at $V_{EXP1}(=V_{m+1})$ and then determines whether $I_{EXP3}$ is greater or less than $I_{MAX(m+1)}$ for the voltage $V_{EXP1}$. Depending on the result, the computer steps the voltage address value in the direction of equality, each time forming a new value of $I_{EXP}$ from $I_{EXP}=m' \times I$ where I is the tube current value taken from the E-curve store, stops when or returns to the address for which $I_{EXP}$ is just less than $I_{MAX}$, and selects the new voltage value $V_{EXP2}$ corresponding to that addresss as the tube voltage for the subsequent fluorographic exposure, and the corresponding E-curve determined value $I_{EXP4}=m' \times I$ as the switch-on tube current. In the case of a large difference between the voltage $V_{FL}$ and the voltage to be employed for the exposure especially when $I_{EXP3}$ is very different from $I_{EXP2}$ and/or $V_{EXP2}$ is significantly different from $V_{EXP1}$, the above procedure can be repeated commencing with the making of a further exposure measurement during fluoroscopy using a tube voltage $V_{EXP2}$.

As soon as final values for the tube voltage and the switch-on tube current has been arrived at, the control assembly 14 causes these to be stored and instructs the controllable power supply 2 to return to the original value $V_{FL}$ of the tube voltage for continued fluoroscopy.

The control assembly 13 is programmed so that an exposure measurement is carried out automatically soon after the start of a fluoroscopy examination, i.e. a short predetermined period after the appropriate fluoroscopy control has been actuated by the operator, and the subsquent calculation of the X-ray exposure parameters is immediately effected so that a fluorographic exposure can be made at any time thereafter. The control assembly 13 can also monitor any change in the exposure conditions during fluoroscopy by continuously or frequently monitoring the controlled tube current $I_{FL}$ since the measured light intensity LI is maintained relatively constant by the automatic fluoroscopy dose control loop, and sensing if the current changes by a predetermined amount indicating that the exposure measurement is no longer valid. When this change is sensed, the control assembly 13 causes a new exposure measurement sequence to be initiated so that the stored values of tube voltage and switch-on tube current for an exposure is continually updated without requiring any attention from the operator.

It should be remembered that the high tension cable connecting the power supply 2 with the X-ray tube will have sufficient electrical capacity to supply a significant additional discharge current to the X-ray tube at the end of a fluorographic exposure after the high voltage from the power supply 2 has been switched off. This can be allowed for by subtracting an offset current $I_D$ from the calculated exposure current $I_{EXP}$ given by $$I_D = L \times V_{EXP}/50 \times T_{EXP}, \tag{7}$$

where L is the length of the high tension cable and the exposure time $T_{EXP}$ is given in milliseconds.

A corresponding correction must also be made to the calibration equation (2) in this case by adding an offset so that the equation now becomes $$LA = \frac{\left(I_{EXP} \times T_{EXP} + \dfrac{L \times V_{EXP}}{50}\right) \times LI}{I_{FL}} \tag{8}$$

The method in accordance with the invention can be readily adapted to the situation in which the X-ray system is employed under pulsed fluoroscopy conditions. Pulsed fluoroscopy is employed in order to "freeze" the movement of a mobile or pulsating organ such as the heart, and involves applying a rather larger tube current $I_{FLP}$ than that for continuous fluoroscopy, for a brief time period $T_p$. The pulses are applied repetitively and can be synchronised with a predetermined timing point in the heart beat cycle, which can be adjusted by the operator. In this situation the quantity LI is derived by integrating the output signal of the photocell 12 in the amplifier 13 for the duration $T_p$ of a fluoroscopy pulse to provide a quantity LQ, the light intensity LI then being given by:

$$LI = LQ/n \times T_p, \tag{9}$$

where n is the number of pulses during which the quantity is integrated. Preferably n−1 so that the exposure data is rapidly made available. The effect of cable capacity is removed from this measurement by gating the integration signal from the photocell 12 by applying a gating pulse via the connection 30, so that the signal is only integrated for the duration of the pulse $T_p$. The exposure values are then calculated as before using the value LI derived in this manner from equation (9).

While the embodiment herein described measures the luminous intensity of the output screen by means of a photocell 12, this measurement can equally well be performed by measuring the amplitude of the video signal generated by the video pick-up tube 6. This is performed in a signal gating, comparison and measurement circuit 32. The measurement signal thus derived is representative of the light intensity LI and can also be used for the automatic control of the X-ray tube dose rate during fluoroscopy.

The measurement circuit 32 first gates the video signal so that signal periods during flyback are removed. The peak white to black signal amplitude is then measured and the black level clamped. The presence of a signal amplitude (white) within a given window range at and just below the peak amplitude is then sensed using a suitable comparator circuit and the proportion of the time that the video signal is present within this window range is measured and used for fluorography dose control. The proportion can be selected, for example a dose control signal can be derived to set the tube current $I_{FL}$ so that the video signal is present within the peak comparator window for about 8.7% of a given time period within the scanned frame representing a circular monitoring area. This is normally called a peak intensity control or sometimes TOP1. Alternatively the target duration for the occurrence of the video signal within the peak window can be about 19.2% of said given time period, which is normally referred to as an average intensity control, or TOP2.

For measuring the light intensity value LI, the mean value of the video signal over the image field, or a selectable region of the image field which can be circular, is measured by suitably gating and integrating the gated portion of the video signal over a picture frame.

Furthermore a combination of a photocell 12 and a video signal measuring arrangement can be employed, for example the video signal measuring circuit 32 can be used to control the fluoroscopy dose and the photocell 12 can be used to measure the exposure light intensity LI, or vice versa. It should also be noted that if the video camera lens 33 is provided with a controlled iris diaphragm 34, a corresponding control 35 must be applied to the measuring circuit 32 in order to maintain an output which is independent of the setting of the iris 34.

What is claimed is:

1. In an X-ray examination system which includes an X-ray tube, a controllable power supply, sensing means for sensing X-radiation beyond an object under examination which is located in the path of X-radiation from the X-ray tube, X-ray exposure control means connected to the sensing means which apply a predetermined tube voltage V and tube current I to the X-ray tube to perform an exposure measurement during which the sensed radiation is measured and use the measurement to calculate an exposure value $I_{EXP}$ of a switch-on tube current which, together with the predetermined tube voltage V, will provide a predetermined exposure density E during an exposure having a predetermined duration $T_{EXP}$:

which system further includes an X-ray image intensifier and wherein the sensing means comprise light sensitive means which determine the luminous intensity of at least part of an output image of the X-ray image intensifier: the improvement wherein:

the light sensing means include means which provide an output signal LI which is representative of the luminous intensity of at least part of an output image of the image intensifier; and the exposure control means first use the output signal to carry out an exposure measurement during a fluoroscopy procedure using a tube voltage $V_{FL}$ and a tube current $I_{FL}$ and thereafter use said output signal to calculate an exposure value $I_{EXP1}$ for a switch-on tube current for application at a tube voltage $V_{FL}$, from the tube current $I_{FL}$, the luminous intensity LI, and the predetermined exposure duration $T_{EXP}$;

further including means which carry out a pulsed fluoroscopy procedure during which the voltage $V_{FL}$ is first applied to the X-ray tube as a sequence of short pulses, each having a duration $T_p$, during each of which the tube current $I_{FL}$ is caused to flow and the exposure control means further comprise means which gate the output of the light sensing means for the duration $T_p$ of each of said short pulses, intergrate said gated output to provide a quantity LQ and calculate the output signal LI from the relationship $$LI = LQ/(n \times T_p)$$

where n is an integer and may be unity.

2. In an X-ray examination system generator which includes an X-ray tube, a controllable power supply, sensing means for sensing X-radiation beyond an object under examination which is located in the path of X-radiation from the X-ray tube, X-ray exposure control means connected to the sensing means which apply a predetermined tube voltage V and tube current I to the X-ray tube to perform an exposure measurement during which the sensed radiation is measured and use the measurement to calculate an exposure value $I_{EXP}$ of a switch-on tube current which, together with the predetermined tube voltage V, will provide a predetermined exposure density E during an exposure having a predetermined duration $T_{EXP}$:

which system further includes an X-ray image intensifier and wherein the sensing means comprise light sensitive means which determine the luminous intensity of at least part of an output image of the X-ray image intensifier: the improvement wherein:

the light sensing means include means which provide an output signal LI which is representative of the luminous intensity of at least part of an output image of the image intensifier; and the exposure control means first use the output signal to carry out an exposure measurement during a fluoroscopy procedure using a tube voltage $V_{FL}$ and a tube current $I_{FL}$ and thereafter use said output signal to calculate an exposure value $I_{EXP1}$ for a switch-on tube current for application at a tube voltage $V_{FL}$, from the tube current $I_{FL}$, the luminous intensity LI and further include means which respond to the selection of a tube voltage $V_{EXP}$ for performing an exposure, $V_{EXP}$ being different from the tube voltage $V_{FL}$ used during fluoroscopy, to calculate a new exposure value $I_{EXP2}$ for the tube current control variable by means of the relationship $$I_{EXP2} \approx I_{EXP1} \times |V_{FL}/V_{EXP}|$$

where p is a function inter alia of the tube voltage.

3. An X-ray examination system as claimed in claim 2, wherein the X-ray exposure control means is arranged to calculate an initial exposure value $I_{EXP1}$, for the switch-on tube current for the tube voltage $V_{FL}$ by using the relationship:

$$I_{EXP1} \approx I_{FL} \times LA/LI \times T_{EXP},$$

wherein LA is a predetermined calibration constant.

4. An X-ray examination system as claimed in claims 2 or 3, wherein the light sensing means comprises a photomultiplier.

5. An X-ray examination system as claimed in claim 2, wherein the light sensing means comprise a video camera tube and circuit means which derive a signal representing the intensity LI from the amplitude of a video output signal from the video camera tube.

6. An X-ray examination system as claimed in claim 2, wherein the X-ray exposure control means include means arranged to respond to the selection of a tube voltage $V_{EXP}$ for performing an exposure, $V_{EXP}$ being different from the tube voltage $V_{FL}$ used during fluoroscopy, to calculate a new exposure value $I_{EXP2}$ for the tube current control variable by means of the relationship $$I_{EXP2} \approx I_{EXP1} \times |V_{FL}/V_{EXP}|p$$

where p is a function inter alia of the tube voltage.

7. An X-ray examination system as claimed in claim 1 or 6 wherein the light sensing means comprise a photomultiplier.

8. An X-ray examination system as claimed in claims 1 or 6, wherein the light sensing means comprise a video camera tube and circuit means which derive a signal representing the intensity LI form the amplitude of a video output signal from the video camera tube.

9. In an X-ray examination system which includes an X-ray tube, a method for controlling the magnitude of X-ray tube switch-on current $I_{EXP}$ for a tube voltage $V_{EXP}$ to provide a radiographic exposure density E as a result of an exposure having a predetermined duration $T_{EXP}$, comprising the steps of:

carrying out an exposure measurement by applying a predetermined tube voltage V to the X-ray tube at a tube current I and measuring the intensity of X-radiation beyond an object which is located in the path of X-radiation from the X-ray tube and calculating therefrom an exposure value $I_{EXP}$ for the switch-on tube current which, at the predetermined tube voltage V, will provide the exposure density E; wherein, as an improvement:

the system further includes an X-ray image intensifier and light sensitive means which are coupled to determine the luminous intensity of at least a part of an output image from the X-ray image intensifier;

the step of carrying out the exposure measurement is performed during a fluoroscopy procedure using a tube voltage $V_{FL}$ and a tube current $I_{FL}$ which are suitable for fluoroscopic examination;

the step of measuring the intensity of X-radiation comprises measuring the luminous intensity LI of at least part of an output image of the image intensifier;

a switch-on tube current $I_{EXP1}$ for use at the tube voltage $V_{FL}$ is calculated from the tube current $I_{FL}$, the luminous intensity LI and the predetermined exposure duration $T_{EXP}$; and further comprising the step of deriving a corresponding new exposure value $I_{EXP2}$ for the switch-on tube current from the exposure value $I_{EXP1}$ which corresponds to the tube voltage $V_{FL}$ used during fluoroscopy in accordance with the relationship $$I_{EXP2} \approx I_{EXP1} \times |V_{FL}/V_{EXP}|, p$$

where p is a function of the tube voltage and the nature of the object under examination.

10. A method as claimed in claim 9 wherein the exposure value $I_{EXP1}$ for the switch-on tube current relating to the tube voltage $V_{FL}$ is derived by computation using the relationship:

$$I_{EXP1} = I_{FL} \times LA/LI \times T_{EXP},$$

wherein LA is a predetermined calibration constant.

11. A method as claimed in claim 9 or claim 10 in which the light sensitive means comprises a video camera tube, wherein the method includes the step of determining the luminous intensity LI from the amplitude of the video signal generated by the video camera tube.

12. A method as claimed in claims 9, 10 or 11 wherein the tube voltage $V_{EXP}$ is defined by a computed lower voltage intersection of a function which relates to tube turn-on current and the tube voltage at a constant exposure density with a limiting boundary function of the operating range of the X-ray tube and as an improvement, an additional X-ray exposure measurement is carried out using the computed tube voltage $V_{EXP}$ and a tube current $I_{FL1}$ which together provide substantially the same X-ray intensity which was produced during the fluoroscopic examination with the tube voltage $V_{FL}$ and the tube current $I_{FL}$.

* * * * *